(12) United States Patent
Gonzalez Iriarte

(10) Patent No.: US 11,215,210 B2
(45) Date of Patent: Jan. 4, 2022

(54) RETAINING SYSTEM FOR JOINTS

(71) Applicant: Christian Gonzalez Iriarte, Seville (ES)

(72) Inventor: Christian Gonzalez Iriarte, Seville (ES)

( * ) Notice: Subject to any disclaimer, the term of this patent is extended or adjusted under 35 U.S.C. 154(b) by 142 days.

(21) Appl. No.: 16/490,703

(22) PCT Filed: Apr. 2, 2018

(86) PCT No.: PCT/ES2018/070290
§ 371 (c)(1),
(2) Date: Sep. 3, 2019

(87) PCT Pub. No.: WO2018/178498
PCT Pub. Date: Oct. 4, 2018

(65) Prior Publication Data
US 2020/0011358 A1 Jan. 9, 2020

(30) Foreign Application Priority Data

Mar. 31, 2017 (ES) .............................. ES201700495

(51) Int. Cl.
*F16B 12/38* (2006.01)
*F16B 7/04* (2006.01)

(52) U.S. Cl.
CPC ............ *F16B 12/38* (2013.01); *F16B 7/0493* (2013.01)

(58) Field of Classification Search
CPC ............... Y10T 403/7001; F16B 12/38; F16B 2012/406; F16B 7/0493; F16B 12/40; F16B 7/0446; A47B 2230/0081; A47B 2230/0085; A47B 2230/0092; A47B 2230/16

See application file for complete search history.

(56) References Cited

U.S. PATENT DOCUMENTS

| | | | | |
|---|---|---|---|---|
| 3,748,814 A | * | 7/1973 | Cribben | E06B 3/99 52/668 |
| 3,822,053 A | | 7/1974 | Daily | |
| 4,148,454 A | * | 4/1979 | Carlson | F16B 12/38 108/152 |
| 5,882,001 A | * | 3/1999 | Reinbold | E04H 17/003 256/22 |
| 9,353,546 B2 | * | 5/2016 | Garza Montemayor | E04H 17/143 |
| 9,979,171 B2 | * | 5/2018 | Lopez Rubio | H02B 1/46 |
| 2009/0175679 A1 | | 7/2009 | Brandel | |
| 2012/0090140 A1 | | 4/2012 | Montemayor | |
| 2012/0139295 A1 | | 6/2012 | Huepperling | |
| 2019/0128299 A1 | * | 5/2019 | Jung | F16L 55/035 |

* cited by examiner

*Primary Examiner* — Matthew R McMahon
(74) *Attorney, Agent, or Firm* — Ruben Alcoba, Esq.

(57) ABSTRACT

A retaining system for joints without utilising welds, screws or any other additional element or accessory, consisting in the making of a closing or locking mechanism, by means of a tab-slot configuration, using only the structure proper of the sections which are the object of the jointing, according to a first section (A) on which the cutting or machining that gives rise to the tabs and an embedment gap is made and a second section (B) that houses the slots and has to fit in the said embedment gap of section (A). Finally, the system is supplemented with the addition of tools that make it possible to release the system, thus making the joint demountable.

3 Claims, 4 Drawing Sheets

Detail A

Detail B

Detail C

RETAINING SYSTEM FOR JOINTS

OBJECT OF THE INVENTION

It is the object of the present invention to provide a simple retaining system for making joints between sections without utilising welds, screws or any other additional element or accessory.

The system that is advocated herein is generally applicable in the construction, furniture, toy and other industries.

BACKGROUND IN THE STATE OF THE ART

The use of structural tubular sections has increased in the past few years thanks to the numerous advantages they have compared to traditional open sections, particularly in truss-like structures. Thus, the structural advantages of this type of section are especially evident when they are going to be subjected to compression or torsion.

Additionally, one of the reasons why the use of tubular sections is gaining traction is aesthetics since they provide neater and sleeker structures, which can have sections with the same outer appearance but very different mechanical properties.

However, despite how ubiquitous its use has become, this type of section has a big drawback when it comes to using it: their joints are harder to make. Thus, these joints are usually made by welding or using additional accessories, both solutions being very costly and hardly efficient. Unlike the state of the prior art, the present invention provides a solution that substantially simplifies the jointing of sections and significantly improves the efficiency and the costs of manufacture and assembly of any frame, framework or structure.

The inventions that make up the state of the art are listed below by title and publication number respectively:

Tubular part, embeddable electrical box, and kits formed y both
WO 2015166131 A1
Jointing system for plastic pipes for creating structures
WO 2000056990 A1
Rapid-action retaining for pipes
WO 2014072539 A1
Ready-to-assemble modular frames and windows and doors made using said system
WO 2014102558 A1
Set of construction parts which form a double-row and double-linkage system for building walls
WO 2007065961 A1
Node for reticulated structures
WO 2006097545 A1
Modular construction system
WO 2013041748 A1
Three-dimensional structural system
WO 2003018923 A1

However, the 'Retaining system for joints' proposed by means of the present invention provides the following advantages with respect to the state of the art:

1. It avoids welded or screwed joints, which entail a higher cost and complexity and a longer execution time.
2. It avoids using any additional element or accessory to make the joint and exclusively utilises the sections to be joined together.
3. It allows a solid, strong and irreversible joint to be made, unlike current joint systems by embedment, which require, once a part has been slid over the other one, fixing said joint by means of welds or other mechanical means since, otherwise, this joint could come undone in the same way that it was made.
4. Unlike welded joints, it allows disassembly thanks to including a tool consisting in a plain folded sheet of metal, which is easy to manufacture and is very economical, with which the joint can be undone without damaging or wearing down the sections.
5. It depends neither on the type of section used, be they open or closed—quadrangular, rectangular or even circular—nor on the type of material—metal, plastic, etc.
6. The tabs and slots on the sections themselves can be made by using any cutting or machining technology that is available on the market: laser, plasma, stock removal, 3D printing, etc.
7. Jointing is done in a simple, entirely manual manner without having to use tools or to first bend any of the elements that are involved in said joint, the locked position being clearly identifiable acoustically and visually, which simplifies the assembly process.

EXPLANATION OF THE INVENTION

The 'Retaining system for joints' of the present invention consists in a closing and locking mechanism that only uses the elements that are the object of the jointing, which are provided with a tab-slot configuration without adding any additional material or element, according to dimensions of the tab and of its corresponding slot ensuring the tab fits inside the slot in a final locked position.

Thus, the aforementioned closing and locking mechanism on which the invention is based can come in any combination with regard to the total number of tab-slot configurations the joint contains, the relative position of the elements to be joined, variations as to the shape, position or angle of the tabs themselves, or of the slots, which could either be through slots, indents, grooves or even striations, the configuration of different tab-slot sets in the same joint being compatible.

Continuing with the description, the closing and locking mechanism can be based on the following configuration:

1. An element (A) provided with a embedment gap of similar dimensions to the outer dimensions of an element (B), as well as with one or more tabs, which are situated on the top horizontal side of the said element (A), adjacent to the embedment gap, and each of the said tabs being the result of making two longitudinal cuts such that the space between both cuts delimits the surface area of said tab.
2. An element (B) which has to fit in the aforementioned embedment gap of element (A) and which only has to be provided with one or more slots on its lateral sides, in such a number, position and dimension that all tabs become housed in their corresponding tab at the exact moment of jointing.

By way of clarification, the description of the above invention can be extended to any possible configuration between or among two or more elements to be joined by utilising the tab-slot configuration, particularly in relation to the cross section of each of them, which can be identical or different, including a embedment gap of any depth or not, it being possible to make the joint in any angle and location, even at the ends of said elements.

In order for the system to work properly, the dimensions of the tabs will depend on the dimensions and thicknesses of both sections and on the location of their corresponding slots. Conversely, every slot must be sufficiently long for the tab to fit in it without play and sufficiently narrow for the tab to rest, upon fitting, on the bottom and top edges of the slot in a stable manner. If the slot were too wide, the tab could go through the slot, causing the system not to work properly.

Likewise, it is important to stress that the actions to be carried out on both sections (A, B) in the terms described are done by simple cutting, emptying or machining and without adding any additional element.

From the sections described above, in order to joint them by way of a jointing process it would be enough to manually slide element (B) inside the embedment gap of element (A), the corresponding tabs being made to bend as both elements near each other, until, at the end of the run in the embedment gap, both elements (A, B) fit together and every tab enters its corresponding slot, reaching the locked position that prevents said elements from moving back in relation to each other.

For a subsequent disassembly, the system also includes a tool that allows the joint to be disassembled in a simple, manual manner without damaging the elements to be joined, which is shaped as a lever and is characterised by a end or handle designed to be manually pressed down on, followed by a bent portion, which acts as a lever, sliding over each tab, and projections on the opposite end, which act as fulcrums.

This tool minimises the force to be exerted and limits the travel of the tabs to prevent an excessive deformation that could damage them. Thus, the sections will not suffer any damage and can be reused. It is also important to highlight the self-locking character of the tool, that is, it will remain stable once it has been actuated and is in its final position, thus doing away with the need to keep pressing down on it during the process of releasing the other tabs.

The disassembly process is carried out in the following steps:
  A. Inserting the tool in the cavity that was formed when each tab bent during the assembly process. The bent portion of the tool must rest on the tab and the projecting ends under the edges of the section.
  B. Pressing down on the tool as a lever such that the bent portion slides over the tab, acting as a lever and pushing it inward until it comes out of the slot, releasing the mechanism, at which moment the tool will reach the end of its travel and remain in that stable position.
  C. Proceeding in the same manner in the other tab utilising a tool that is identical to the foregoing.
  D. Once both tools are in their unlocked position, disassembling the joint by manually separating the sections, which will not have suffered any damage and will therefore be ready to be reused.

DESCRIPTION OF THE DRAWINGS

To supplement the description made herein and in order to help to better understand the features of the invention, in accordance with a preferred example of an embodiment thereof, a set of drawings has been attached as an integral part of said description, where the following has been depicted for illustrative, non-limiting purposes.

Figure 1:
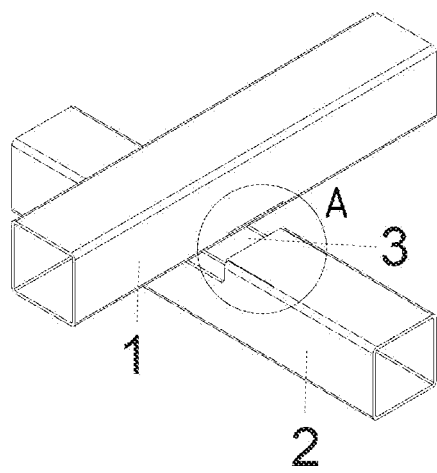
FIG. 1 is a main perspective view of two sections to be joined by utilising the 'Retaining system for joints' before the joint is made.
Figure 2:
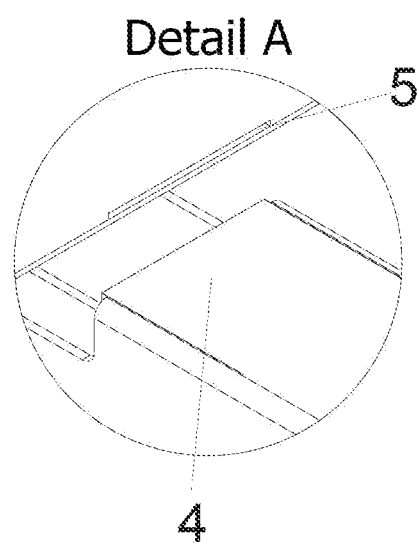
FIG. 2 is a detail A of the main perspective view of two sections to be joined by utilising the 'Retaining system for joints' before the joint is made.
Figure 3:
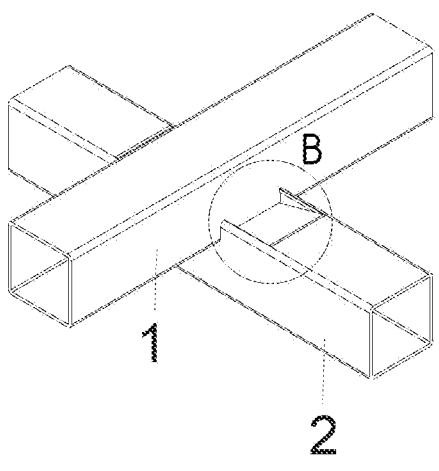
FIG. 3 is a main perspective view of two sections to be joined by utilising the 'Retaining system for joints' in their final locked position.
Figure 4:
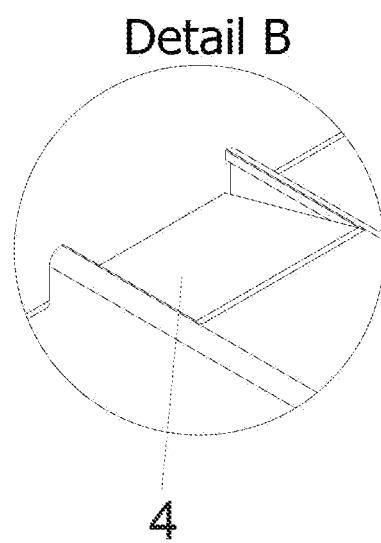
FIG. 4 is a detail B of the main perspective view of two sections to be joined by utilising the 'Retaining system for joints' in their final locked position.
Figure 5:
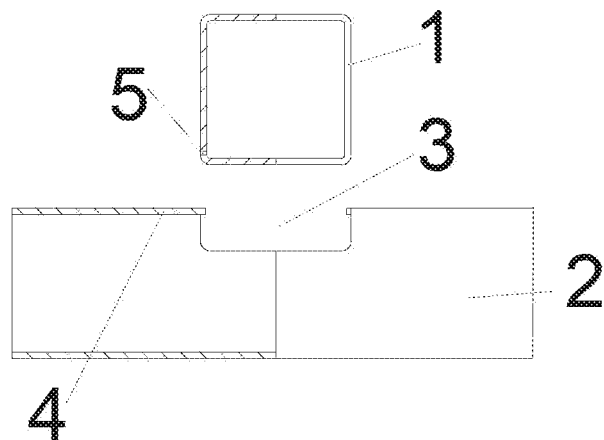
FIG. 5 is a main elevational and cross-sectional view of two sections to be joined by utilising the 'Retaining system for joints' when they near each other to carry out the jointing.
Figure 6:
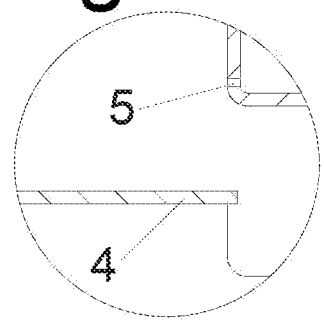
FIG. 6 is a detail of the relative positions of the tab and the slot of the foregoing figure.
Figure 7:
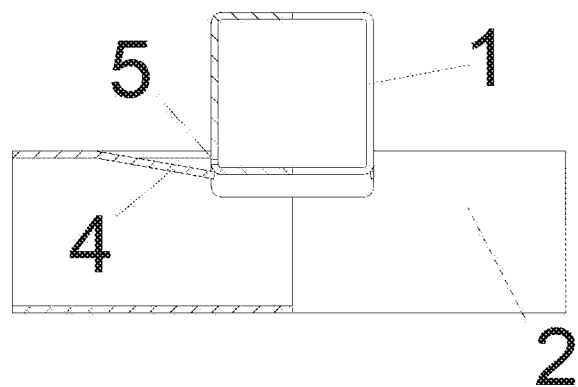
FIG. 7 is a main elevational and cross-sectional view of two sections to be joined utilising the 'Retaining system for joints', where section (B) housing the slots is bending the tabs as it enters the embedment gap and is not in the locked position yet.
Figure 8:
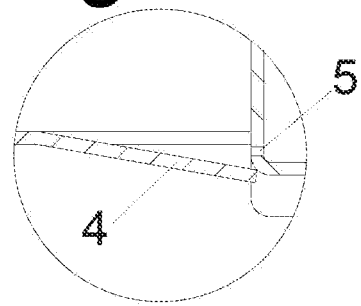
FIG. 8 is a detail of the relative positions of the tab and the slot of the foregoing figure.
Figure 9:
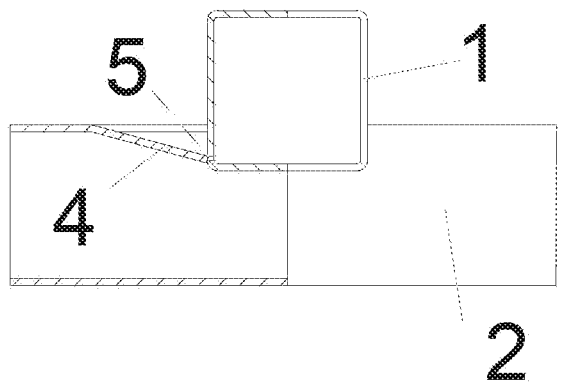
FIG. 9 is a main elevational and cross-sectional view of two sections to be joined by utilising the 'Retaining system for joints', where both sections have fit together and two tabs have entered their corresponding slots.
Figure 10:
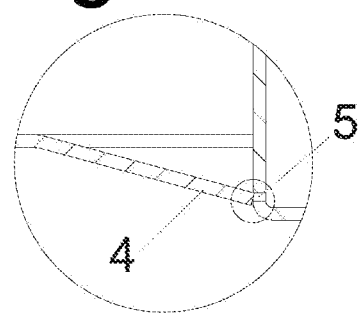
FIG. 10 is a detail of the relative positions of the tab and the slot of the foregoing figure.
Figure 11:
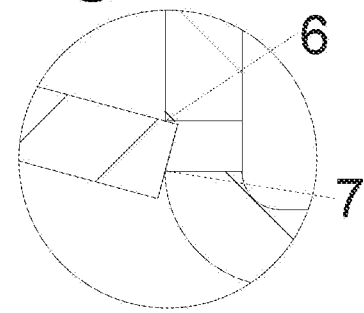
FIG. 11 is a detail of the detail of the foregoing figure so as to be able to see the two points of contact between the tab and the slot.
Figure 12:
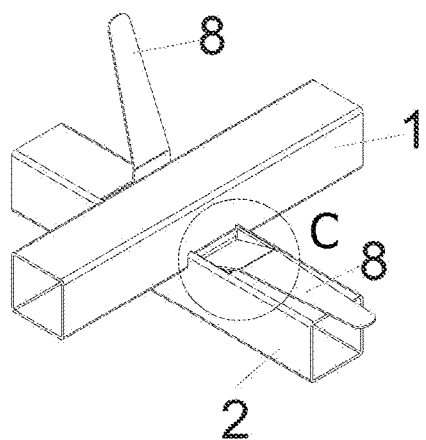
FIG. 12 is a main perspective view of the 'Retaining system for joints' with two tools according to a final unblocked position in an anterior tab and to an initial position in a posterior tab.
Figure 13:
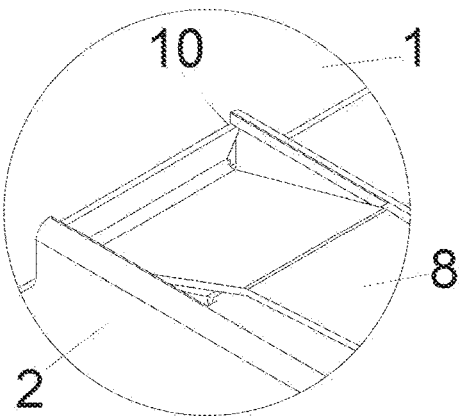
FIG. 13 is a detail C of the main perspective view of the 'Retaining system for joints' so as to be able to see how the tool rests over the tab and under the edges of the section.
Figure 14:
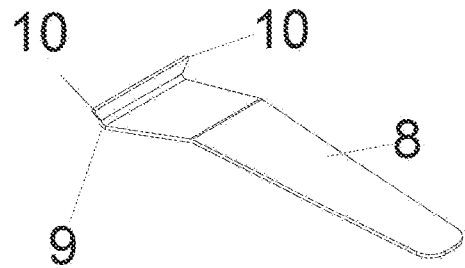
FIG. 14 is a main perspective view of a tool.

The following constituent elements can be highlighted in the aforementioned figures:
1. Top section
2. Bottom section
3. Embedment gap
4. Two tabs
5. Two slots
6. Top slot edge
7. Bottom slot edge
8. Tool
9. Bent portion of the tool
10. Ends of the tool

PREFERRED EMBODIMENT EXAMPLE

By way of a preferred embodiment of the 'Retaining system for joints', it can be seen in the light of FIGS. 1 to 17 how the jointing of two square tubular sections 1, 2 made of carbon steel is tackled utilising the present invention.

Thus, for example, it is possible, using laser technology, to make the cuts on both sections, making two slots 5 on top section 1, whereas a corresponding embedment gap 3 and the four cuts that would give rise to two tabs would have to be made on bottom section 2, the latter being made on the top surface of said bottom section 2 and adjacent to the embedment gap.

From the described sections, to carry out the jointing thereof it would be enough to manually and perpendicularly insert top section 1 inside bottom section 2 through its embedment gap 3, the two tabs 4 being forced to bend as both sections near each other and until both fit together at the end of their run, at which moment tabs 4 enter their corresponding slots 5, coming in contact with two bottom and top edges of tabs 6, 7 and preventing both sections 1, 2 from sliding backwards.

As far as tool 8 is concerned, it can be made from a simple, bent sheet of metal disposed to act as a lever, as shown in FIGS. 12 to 17, such that by pressing down on tabs 4, it will cause them to come out of their slots and release the locking, minimising the force to be exerted and limiting the run of tabs 4 in order to prevent an excessive deformation that could end up damaging them.

Figure 15:
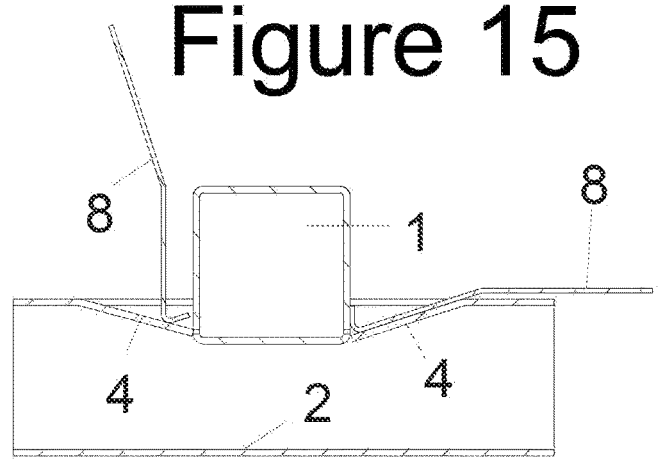
FIG. 15 is a main cross-sectional view of FIG. 12 of the 'Retaining system for joints' with two tools.

Turning now to the disassembly process, it is carried out by inserting tool 8 by its ends 10 opposite the handle in the cavities for going inside section 2 that tabs 4 formed upon bending, such that the bent portion of tool 9 rests on tab 4. Thereupon, tab 4 will come out its slot 5 by pressing down on tool 8 by way of a lever, disabling the corresponding locking 6, 7, this moment coinciding with the end of the run of tool 8, which is in a stable position, as shown in FIGS. 15 to 17.

Figure 16:
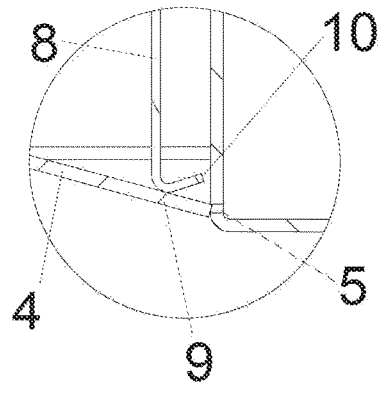
FIG. 16 is a detailed, main cross-sectional view of FIG. 12, where the initial position of the tool on the left side can be seen.
Figure 17:
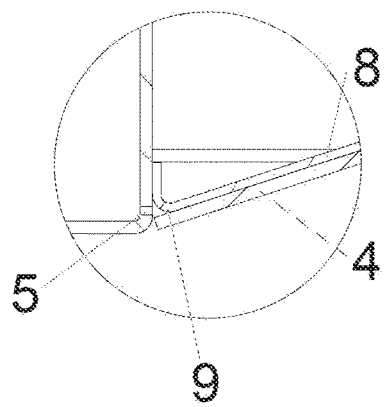
FIG. 17 is a detailed, main cross-sectional view of FIG. 12, where the final unlocked position of the tool on the right side can be seen.
Figure 18:
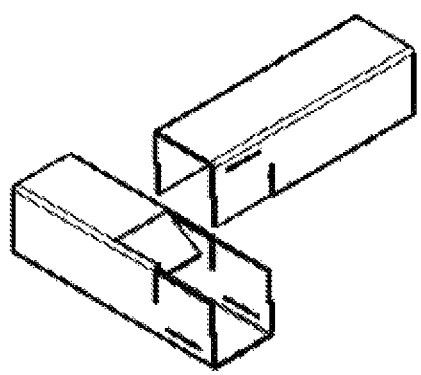
FIG. 18 is a main perspective view of the 'Retaining system for joints' applied to a corner joint, before making the assembly, where the two pieces to be joined are identical and both have trapezoidal tabs and slots.
Figure 19:
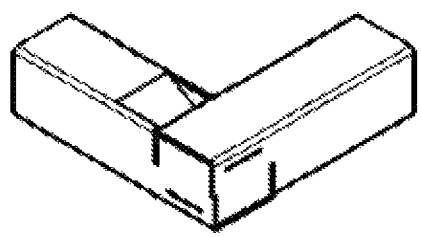
FIG. 19 is a main perspective view of the 'Retaining system for joints' applied to a corner joint and once the assembly has been made.
Figure 20:
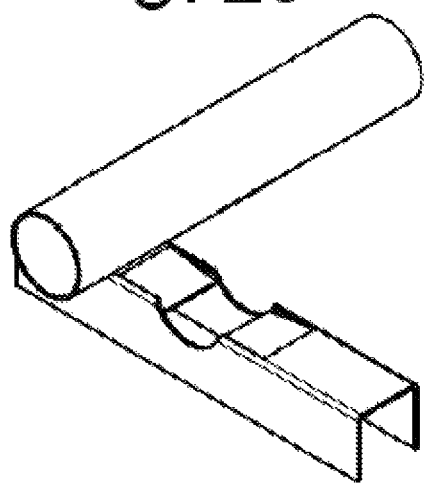
FIG. 20 is a main perspective view of the 'Retaining system for joints' applied to a cross-shaped joint, before making the assembly, between a tube with a circular cross-section and with slots and an open U-section with an embedment gap and tabs.
Figure 21:
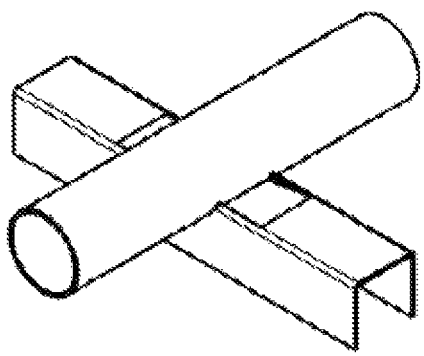
FIG. 21 is a main perspective view of the 'Retaining system for joints' applied to a cross-shaped joint between a tube with a circular cross-section and with slots and an open U-section with an embedment gap and tabs, once assembled.
Figure 22:
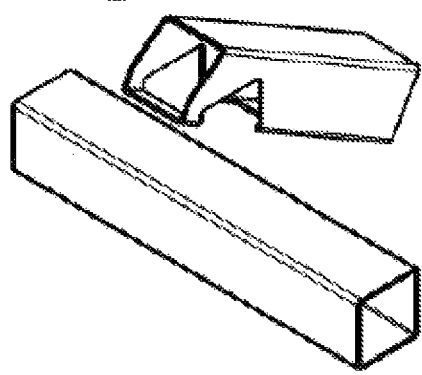
FIG. 22 is a main perspective view of the 'Retaining system for joints' applied to a 30-degree angle joint.
Figure 23:
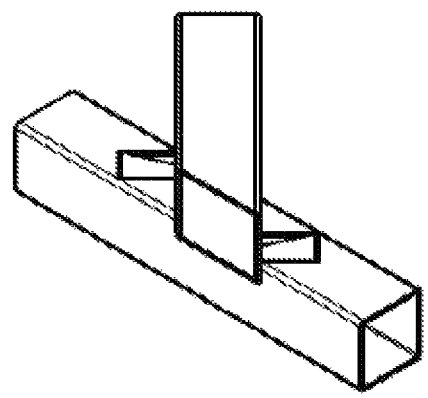
FIG. 23 is a main perspective view of the 'Retaining system for joints' applied to a 45-degree angle joint.

Thus, in FIG. 16 tool 8 has already been inserted, although tab 4 is still in its closed position inside slot 5. On the other hand, in FIG. 17 tool 8 is in its final position without it being necessary to exert pressure down on it, forcing tab 4 to remain in its open position, without resting on slot 5 and thus without preventing the manual separation of both sections 1, 2. In other words, the operating mode of both disassembly tools 8 is self-locking, such that they will remain stable when they reach their final position, making disassembly more comfortable by not having to press down on the two tools 8 at the same time to be able to bring the sections apart.

Once the joint has been disassembled, the two tools 8 will be removed and tabs 4 will return to their closed position, the two sections 1, 2 being available for making the joint again as many times as desired.

By way of a preferred embodiment, FIGS. 18-23 show alternative configurations based on the same invention.

It has not been deemed necessary to make this description any longer in order for a person skilled in the art to be able to understand the scope of the invention and the advantages that are derived therefrom. The materials that are used to manufacture every section; its dimensions; the use of square, rectangular, circular cross-section tubular sections, or even open sections, or any combination thereof, including any other type of element to be joined; the relative position of said elements; the different possible tab-slot configurations; the degree of penetration of one in the other; the types of joints; and the cutting technology will be susceptible of changing provided this does not mean altering the essentialness of the invention.

The terms in which the specification has been described have to be understood in a wide, non-limiting sense.

The invention claimed is:

1. A retaining system for joints built into a first and a second element, which are the object of the jointing, without providing any additional material or element, and which, upon fitting together, generate a closing and locking mechanism, characterized in that the first element is provided with an embedment gap (3) so dimensioned such that the second element fits in said embedment gap (3), as well as one or more tabs (4), which are situated on a side of the said first element, adjacent to the embedment gap (3), each of said tabs (4) being the result of making two longitudinal cuts such that the space between both cuts delimits the surface area of said tab (4); and said second element being provided with one or more slots (5) on its lateral sides, in such a number, position and dimension that all of said one or more tabs (4) become housed in a corresponding slot (5) at the exact moment of jointing, wherein the slots (5) can be indents, grooves, scores, channels or just striations, and wherein the slots have such a dimension that the tab (4) fits in it without play, and rests on its bottom and top edges in a stable manner; and, apart from the described assembly, a disassembly tool (8) consisting in a simple lever with a self-locking operation, which comprises an end or handle (10) designed to be manually pressed down on, followed by a bent portion (9) that rests on the tab acting as a lever and projections on the opposite end, which act as fulcrums.

2. A process for jointing of the retaining system for joints according to claim 1, which is carried out by manually sliding the second element inside the embedment gap (3) of the first element, promoting the closing of the locking mechanism, making the corresponding tabs (4) being made to bend as both elements near each other, until, at the end of the run in the embedment gap (3), both first and second elements fit together and every tab (4) enters its corresponding slot (5), reaching a locked position that prevents said elements from sliding back in relation to each other.

3. A process for disassembling the retaining system for joints according to claim 1, comprising the following stages: inserting the tool (8) in a gap that was formed when each tab (4) was bent during the jointing process such that the bent portion (9) of the tool (8) rests on the tab (4) and the fulcrums rest under the edges of the first element containing the tab (4), pressing down on the tool (8) as a lever such that the bent part (9) slides over the tab (4), acting as a lever and pushing it inward until it comes out of the slot (5), releasing the mechanism, at which moment the tool (8) will reach the end of its run and remain in a stable position, proceeding in the same manner in the other tabs (4), if any, utilizing another tool (8) that is identical to the tool, and once the elements that form the joint are not in a locked position anymore, disassembling the joint by manually separating them.

* * * * *